United States Patent
Osenberg et al.

(10) Patent No.: US 9,354,086 B2
(45) Date of Patent: May 31, 2016

(54) FIBER OPTIC MEASURING APPARATUS

(75) Inventors: Reinhard Osenberg, Wuppertal (DE);
Nico Emde, Wetter (DE); Peter Funken, Frechen (DE)

(73) Assignee: Draka Cable Wuppertal GmbH, Wuppertal (DE)

( * ) Notice: Subject to any disclaimer, the term of this patent is extended or adjusted under 35 U.S.C. 154(b) by 309 days.

(21) Appl. No.: 13/146,713

(22) PCT Filed: Jan. 29, 2010

(86) PCT No.: PCT/EP2010/000547
§ 371 (c)(1),
(2), (4) Date: Jul. 28, 2011

(87) PCT Pub. No.: WO2010/086178
PCT Pub. Date: Aug. 5, 2010

(65) Prior Publication Data
US 2011/0292377 A1    Dec. 1, 2011

(30) Foreign Application Priority Data
Feb. 2, 2009 (DE) .......................... 10 2009 007 142

(51) Int. Cl.
*G02B 6/00* (2006.01)
*G01D 5/26* (2006.01)

(52) U.S. Cl.
CPC ..................................... *G01D 5/268* (2013.01)

(58) Field of Classification Search
None
See application file for complete search history.

(56) References Cited

U.S. PATENT DOCUMENTS

| | | | | | |
|---|---|---|---|---|---|
| 3,929,398 | A | * | 12/1975 | Bates | 356/416 |
| 5,035,511 | A | * | 7/1991 | Berthold | 374/124 |
| 5,062,686 | A | * | 11/1991 | Barrow et al. | 385/33 |
| 5,825,804 | A | * | 10/1998 | Sai | 374/137 |
| 5,845,033 | A | * | 12/1998 | Berthold et al. | 385/12 |
| 6,167,148 | A | * | 12/2000 | Calitz | G01N 21/956 348/126 |
| 6,299,104 | B1 | | 10/2001 | El-Sherif | |
| 6,839,366 | B1 | | 1/2005 | Houle | |
| 2003/0205083 | A1 | * | 11/2003 | Tubel et al. | 73/152.19 |
| 2006/0268241 | A1 | * | 11/2006 | Watson et al. | 353/94 |
| 2007/0188768 | A1 | * | 8/2007 | Mansfield | G01B 11/0675 356/504 |

FOREIGN PATENT DOCUMENTS

| | | |
|---|---|---|
| CN | 201147308 Y | 11/2008 |
| EP | 0 930 679 A2 | 7/1999 |
| EP | 1 672 755 A2 | 6/2006 |
| EP | 1 713 151 A1 | 10/2006 |
| GB | 2 347 520 A | 9/2000 |
| GB | 2 430 761 A | 4/2007 |
| WO | WO 2005119328 A1 * 12/2005 ......... G02B 21/0032 |
| WO | 2006 105249 A2 | 10/2006 |
| WO | 2007 103898 A2 | 9/2007 |
| WO | 2008 044839 A1 | 4/2008 |
| WO | 2008 062392 A2 | 5/2008 |

OTHER PUBLICATIONS

Office Action for the Chinese Application No. 201080006380.X dated Apr. 3, 2015.

* cited by examiner

*Primary Examiner* — Uyen Chau N Le
*Assistant Examiner* — Chris Chu
(74) *Attorney, Agent, or Firm* — Kelly & Kelley, LLP

(57) ABSTRACT

The invention relates to a fiber optic measuring apparatus and a related method which includes a number of sensors which are integrated in a cable and detect a mechanical load, a temperature and/or corrosive gases, characterized in that the sensors are supplied with light from a source and the sensors form a fiber optic network.

20 Claims, 5 Drawing Sheets

FIBER OPTIC MEASURING APPARATUS

TECHNICAL FIELD

The invention relates to a fibre-optic measuring apparatus, in particular for the measurement of loads in particular of cables, in particular according to the preamble of claim 1, a beam source and a method therefor.

PRIOR ART

When operating offshore wind power plants, for example, loading states are achieved in these which definitely have negative effects on the wind power plants themselves, which can lead to failure of the plant or to destruction of components of the wind power plant.

For the efficient operation of offshore wind power plants, it is therefore important to provide a suitable sensor technology for the permanent long-term detection of the operating states of various plant components in order to optimise the availability of the plants or to minimise the proportion of maintenance.

Whereas the loading states of the rotor blades and the turbine transmissions have already been detected by sensor technology in the past, almost no information is available on the loading states of the low- and medium-voltage cables.

In particular for operators of wind power plants, it is therefore fundamentally desirable to obtain information, optionally also online and in situ, about various cable parameters such as, for example, loads, temperatures, corrosion, etc in order to optionally link replacement or repairs to regular service intervals. This information must advantageously be available by means of a sensor network and be able to be administered in a central data centre.

The same applies to refrigerated containers. Here it is frequently also problematical to detect a mechanical loading of the cable inlets, for example, caused by squashing, continuously and in a spatially resolved manner. Local mechanical loads can lead to a power failure, which in extreme cases can lead to a complete destruction of the container load.

DESCRIPTION OF THE INVENTION: OBJECT, SOLUTION, ADVANTAGES

It is the object of the invention to provide a fibre-optic measuring apparatus, a beam source and a method therefor such as in particular a sensor system in particular for power cables, for example for the fields of application of refrigerated containers and offshore wind power plants, which enables the loading state of the power cables used in particular in the containers or wind power plants to be detected for various parameters, in particular discretely or continuously, and thus identify in good time or predict possible technical problems and/or imminent failures. These results are in principle transferrable to almost all areas of application of power cables.

With regard to the measuring apparatus, this is achieved with the features of claim 1, wherein a fibre-optic measuring apparatus is provided, comprising a number of sensors which are integrated in a cable and detect a mechanical load, a temperature and/or corrosive gases, characterised in that the sensors are supplied with light from a source and the sensors form a fibre-optic network.

It is advantageous if the sensors are coupled to one another in such a manner that the results of the sensors are evaluated by means of a central evaluation unit and/or the sensor elements are operated with only a single light beam source.

In this context it is expedient if starting from a light source at least one optical fibre is provided, on or in which the sensors are provided.

It is also expedient if, starting from a light source a beam splitter is provided and at least two optical fibres are provided, on or in which the sensors are provided.

It is furthermore advantageous if the sensor for detection of the mechanical deformation and the sensor for detection of the temperature are provided on a fibre.

It is also appropriate if the sensor for detecting the bending is provided on the same or on a different fibre.

In a further exemplary embodiment it is expedient if periodic refractive index structures in fibre or optical waveguides are introduced by local focussing of ultrashort light pulses into the core of the fibre so that single frequencies of a white light source or a broad-band emitter are reflected depending on the period spacing.

It is also advantageous if the mechanical loading of the cable or the fibre, for example, due to bending or twisting, is deduced from a shift of the back-reflected frequency components.

It is furthermore advantageous if a time-resolved measurement of the light back-scattering signals is made after a high-intensity short-pulse laser beam has been coupled into an untreated fibre-optic cable.

It is also expedient if the time-resolved light back-scattering measurement for two differently scattered light components provides the possibility of a local temperature measurement and/or local detection of the mechanical loads of the power cable.

In a further exemplary embodiment it is advantageous if the two differently scattered light components are the Stokes and the anti-Stokes component.

It is advantageous if the light beam source is a passively Q-switched microchip laser with subsequent generation of white light.

It is furthermore expedient if the white light is generated by a downstream nonlinear optical component, preferably a photonic fibre.

It is also advantageous if frequency ranges are filtered out from the white light spectrum by means of optical filters, by which means the individual sensor elements are triggered.

It is furthermore advantageous if the networking of the individual sensors or sensor elements is accomplished by multiplexing and the interrogation of the measurement signals is accomplished sequentially.

It is furthermore advantageous if the measuring apparatus is configured in such a manner that electromagnetic radiation generated by a beam source can be coupled into a fibre-optic cable, in particular for the simultaneous measurement of spatially resolved temperatures and mechanical loads, wherein the fibre-optic cable is provided with fibre Bragg gratings (FBGs).

It is also advantageous if the period of the FBGs is selected so that no FBG corresponds to the selected laser wavelength so that the radiation having the selected laser wavelength can propagate undisturbed in the optical waveguide and can advantageously be used for spatially resolved measurement of temperature or squashing.

It is furthermore advantageous if the FBGs are written into the fibre-optic cable with ultrashort light pulses such as, for example, femtosecond light pulses.

It is also advantageous if the reflected signal components of the sensors are separated from one another by means of a fibre coupler (218).

The object regarding the beam source is achieved by a beam source, in particular for a fibre-optic measuring apparatus, in particular according to any one of the preceding claims, for generating continuum radiation and short-pulse emission at a defined laser wavelength, wherein a filter, such as an interference filter suppresses the continuum emission in a defined spectral range around the defined laser wavelength.

In this context, it is expedient if the interference filter is a so-called notch filter or band-elimination filter or notch filter.

It is also expedient if the beam source is used for coupling the generated electromagnetic radiation into a fibre-optic cable for the simultaneous measurement of spatially resolved temperatures and mechanical loads, wherein the fibre-optic cable is part of a measuring apparatus which is provided with FBGs.

The object for the method is achieved by a method for operating an fibre-optic measuring apparatus described above.

It is advantageous in this case to detect the following process variables such as the spatially resolved temperature profiles and the mechanical pressure loadings in the cables. This can advantageously be achieved by a time-resolved measurement of laser back-scattering signals. The mechanical loading of cables such as the elongation and/or the twisting can be determined by using fibre Bragg sensors and the ozone concentration produced at the transformers by corona discharge can be continuously detected by means of a pertinent sensor.

All these measured variables are advantageously detected by fibre-optic individual sensors which are then interconnected in a fibre-optic sensor network. Individual measured variables can also be detected jointly by one sensor if this is suitably configured. It is advantageous in this context if the data of the sensors are relayed to a central processing unit and then advantageously evaluated and processed centrally there.

In order to thereby achieve the most inexpensive and therefore economic solution, the required opto-electronic "hardware" or the required opto-electronic sensor is installed centrally and the individual measurement points or stations such as, for example, wind power plants or refrigerated containers are then interrogated sequentially via the fibre network.

An advantageous embodiment in this case relates to the provision of the fibre network for data acquisition and/or transmission of information as well as the parallel or sequential interrogation of the individual measurement points. A prerequisite for this in turn is the provision of a single suitable optical beam source.

BRIEF DESCRIPTION OF THE DRAWINGS

The invention is explained in detail on the basis of an exemplary embodiment with reference to the drawings. In the figures:

FIG. 5b shows a diagram and

PREFERRED EMBODIMENT OF THE INVENTION

Figure 1:
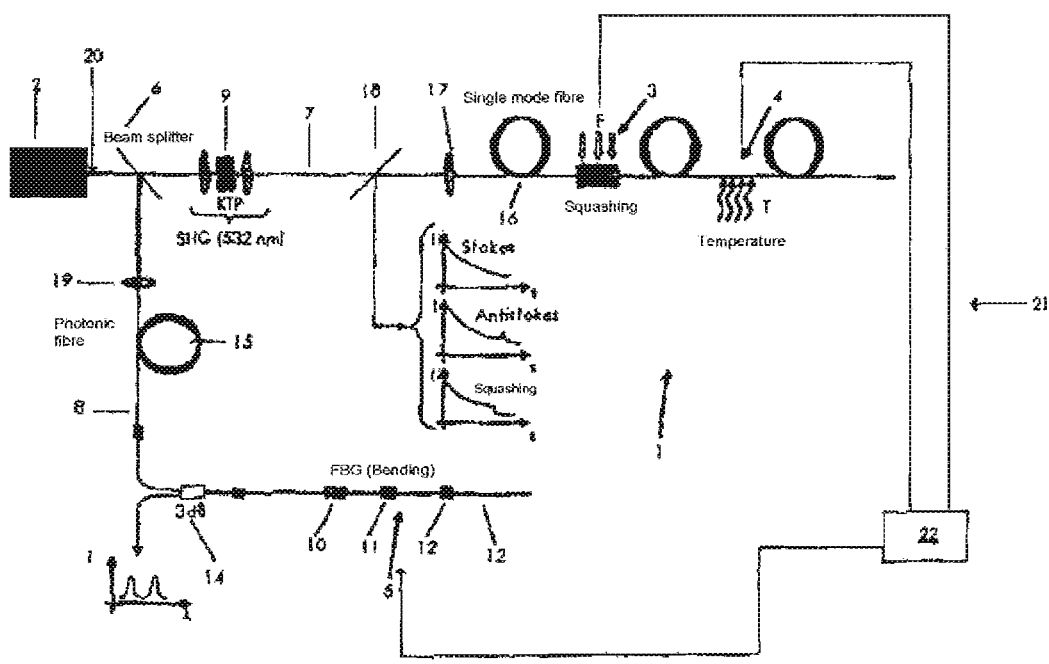
FIG. 1 shows a schematic view of a fibre-optic measuring apparatus.

FIG. 1 shows a schematic diagram of a fibre-optic measuring apparatus 1 with a laser 2. The measuring apparatus in this case consists of a plurality of sensors 3, 4, 5 for the measurement of squashing, temperature and/or bending preferably of a cable.

The apparatus 1 comprises a beam splitter 6 which divides the light or laser beam into two fibres 7, 8. An apparatus 9 for frequency doubling, is provided in the beam of the fibre 7, a lens 17 and another beam splitter 18. A lens 19 is disposed in the beam of the fibre 8.

The sensor 5 for measurement of elongation and torsion of the cable 20 and that of the power cable consists of a plurality of successive fibre Bragg gratings (FBG) 10, 11, 12 in a glass fibre 13 which reflect the guided light at different wavelengths. The spectral shift of the reflected FBG wavelengths is measured with the aid of a broad-band beam source and a microspectrometer 14. Broad-band beam sources can be fabricated inexpensively at different wavelengths. They are available advantageously in the form of LEDs primarily in the visible range, in the 800-850 nm range and around 1550-1600 nm.

Fibre Bragg gratings are available commercially for example at wavelengths around 1550 nm. However, periodic refractive index modulations can be written into any glasses by means of high-power femtosecond laser pulses so that by this method in particular FBGs can be produced at 800-850 nm in conventional fibre-optic cable. This results in an appreciable cost reduction for a corresponding FBG sensor system 21 since standard silicon technology can be used in particular for the detectors.

The spatially resolving fibre-assisted temperature sensor 4 is based on the time-resolved measurement of laser back-scattering signals. The essential thing here is that the anti-Stokes Raman line is based on a nonlinear excitation process and therefore depends on the ambient temperature. Short and high-intensity light pulses having high peak power are then coupled into the fibre 7 and the temporal decay of the intensity of the back-scattered Raman photons is measured.

As a result of the small scattering cross-section, single photons are counted, which are summed over many laser pulses. Since the scattering cross-section increases substantially for short laser wavelengths, preferably a light source such as, for example, a microchip laser in the visible or in the near infrared range is preferred for this sensor 4. For single system solutions semiconductor lasers operated in short-pulse mode or light-emitting diodes offer possibilities here for economically particularly interesting system solutions. The visible spectral range offers the further advantage that photomultipliers are available here as extremely sensitive single photon counters.

A sensor element based on light-emitting diodes (LED) is used here as a gas sensor for measurement of the ozone content of the ambient air. This consists of a hollow cylinder whose inner surface is shaped in such a manner that all the incident rays are collected at one point. With this arrangement it is possible to focus an extremely divergent beam source such as, for example, an LED in a punctuate manner. An LED emitting in the ultraviolet spectral range is mounted on one side of the cylinder and a suitable detector, e.g. a photodiode, on the other side.

The LED light is now completely imaged on the detector by means of the geometrical imaging by the suitably, in particular hyperbolically, shaped hollow cylinder. The gas to be studied now flows through the hollow cylinder and this acts as an optical absorption cell. With a suitable choice of the LED wavelength, e.g. 250 nm for ozone measurements, a portion of this light is absorbed in the hollow cylinder during its propagation and this intensity variation can be calculated back to a particle concentration, such as ozone for example, using the Beer-Lambert absorption law. The electrical photodiode signal is converted into an optical signal and transmitted to the control centre by means of fibre optics. It is thereby possible to produce a miniaturised, network-integrated sensor element for permanent trace detection of, for example, ozone concentrations having comparatively simple components.

The individual sensors in this case are independent individual components since ultraviolet radiation can substantially only be transmitted in quartz fibres which at the present time, however are not used as standard for data transmission. The fibre-optic networking is therefore accomplished merely by means of optical data transmission in standard fibre optics.

One aspect of an exemplary embodiment of the invention is the networking of different sensors to form a fibre network 21 for monitoring the loading state of cables such as, for example, power cables. This can be implemented economically in particular when the number of cost-intensive components can be reduced which is achieved by the network approach described above.

This aspect of the invention can be implemented advantageously if a single beam source is identified for the different sensors. This is accomplished advantageously by using an ultrashort pulse source having a corresponding spectral bandwidth. The preferred embodiment of such a beam source is a microchip laser having a downstream photonic fibre 15 for generating white light (continuum radiation), wherein the spectral ranges of interest for sensor technology can then be filtered out from the white light spectrum by a suitable choice of colour filters. In this way, a single beam source 2 can be used both for the FBG sensor technology 5 (e.g. 800-850 nm spectral range) and also for the temperature measurement 4 and mechanical loading under squashing 3 by means of time-resolved Raman backscattering measurements.

According to the prior art, each individual fibre-optic sensor principle requires special beam sources so that the fabrication of a fibre-optic sensor network is not practicable from economic viewpoints.

Passively Q-switched microchip lasers are technologically simple beam sources which emit light pulses in the nanosecond range at repetition rates into the kHz range and as a result of the high pulse peak powers are very well suited for generating white light by utilising nonlinear optical effects in, for example, photonic fibres. A fibre-optic sensor network having the properties described above can then be achieved from economic viewpoints.

FIG. 1 shows the principle of such a sensor fibre network 1 such as can be used for real-time monitoring of thermal and mechanical loads. The microchip laser 2 is shown as the primary beam source, a portion of the radiation is branched off by means of a beam splitter 6, possibly frequency doubled 9 and then coupled into a conventional telecommunications fibre 16 in order to detect thermal and mechanical disturbances in the cable in a spatially resolved manner by means of the detection of Raman back-scattering signals.

The fibre-optic cable itself is integrated in a power cable. The other portion of the laser radiation is coupled into a photonic fibre 15 for continuum generation. The fibre is in turn spliced with another telecommunications fibre into which FBGs 10, 11, 12 had been previously written at suitable positions by means of femtosecond light pulses. The measurement of the back-scattered frequency components allows the detection of mechanical loads, for example, twisting and bending, of the cable.

The detection of the mechanical loading states in the power cable with integrated standard optical waveguides by time-resolved measurement of light back-scattering signals may be mentioned as a single component for the sensor system. The excitation of light can be accomplished with a selected frequency range of the white light source described above and thus integrated into a sensor network 21.

Figure 2:
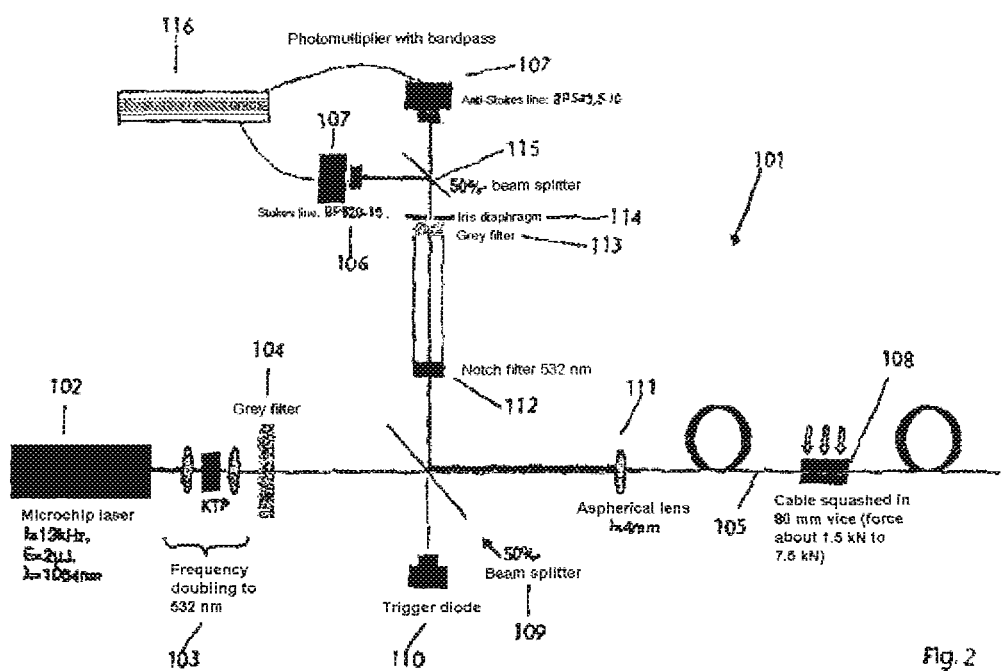
FIG. 2 shows a schematic view of a fibre-optic measuring apparatus.

An exemplary embodiment of a single solution of this apparatus 101 is shown in FIG. 2. Here the green emission of a microchip laser 102 is used for optical excitation. After the laser 102 a frequency doubling 103 is carried out, which is followed by a grey filter 104.

If light having sufficient intensity is guided in an optical waveguide 105, a scattering component shifted into the red spectral range (Stokes component 106) is observed as well as a significantly weaker component which is shifted into the blue spectral range (anti-Stokes component 107). In this case the anti-Stokes component 107 is quadratically dependent on the emitted light intensity:

$$I_{AS} \sim I_L^2 \quad (1)$$

If the cable or power cable 108 is exposed to particularly high loads at one position, e.g. due to squashing, then scattering centres are increasingly formed at this point in the optical waveguide 105 integrated in the power cable 108, which can be identified by time-resolved measurement of Stokes and anti-Stokes back-scattering signals. A beam splitter 109 and a pertinent trigger diode 110, an aspherical lens 111 can further be identified. In the beam path after the beam splitter 109 is a notch filter 112, a grey filter 113 and an iris diaphragm 114 with a downstream beam splitter 115 as well as evaluation electronics after the photomultipliers 107.

Figure 3:
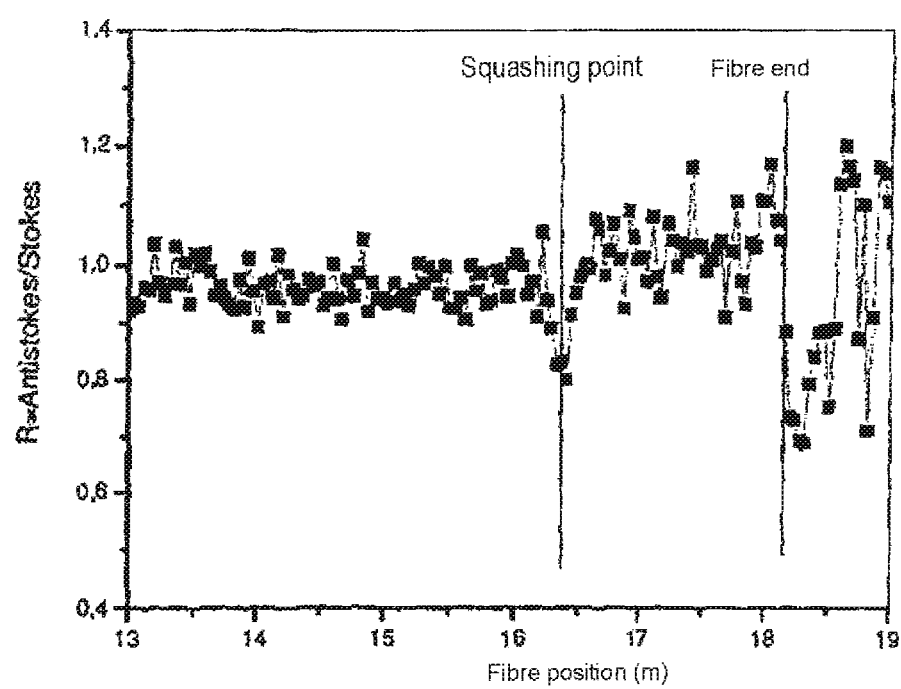
FIG. 3 shows a diagram.

FIG. 3 shows the ratio of anti-Stokes to Stokes signal for different fibre positions, wherein the fibre position 16.5 m was exposed to a mechanical squashing load. The squashing region can be clearly locally identified.

As a result of the quadratic intensity dependence, the measurement of the anti-Stokes Raman line intensity in particular offers the possibility of a very sensitive detection of measured values. The Stokes line intensity can then, for example, serve as the signal standardisation. The use of pulsed semiconductor lasers or LEDs instead of the microchip lasers is advantageous, for example, in the network variant since this can be inexpensive.

In the case of sensor networks, according to the invention a light-intensive microchip laser optionally with tracked white light or continuum generation is used as the central light source which is then guided by means of multiplexing to the individual measurement points. The backscattered light (Stokes and anti-Stokes) can then be processed again by a central data acquisition and evaluation unit 22 by means of sequential interrogation of the various optical waveguides. By means of this type of networking the costs for an individual measurement fibre can be reduced significantly.

Figure 4:
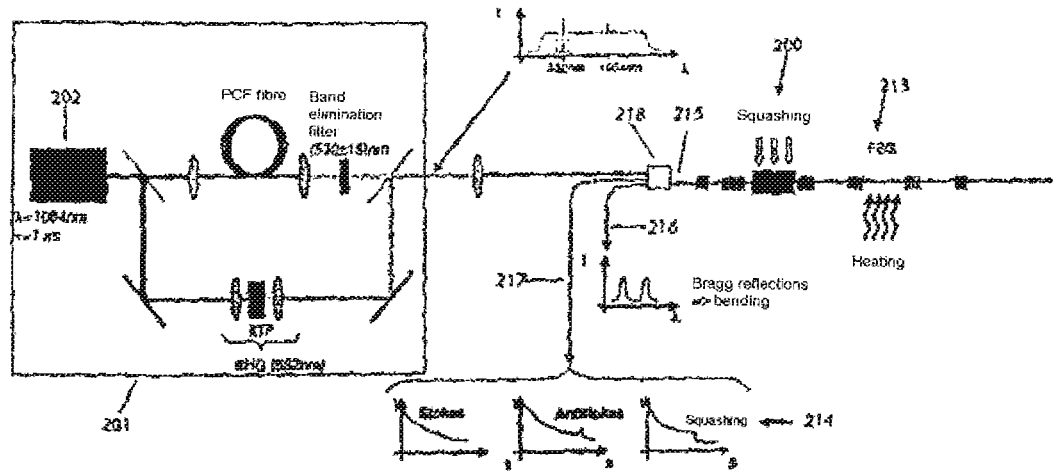
FIG. 4 shows a schematic view of a fibre-optic measuring apparatus.

A further particularly advantageous embodiment of the measuring apparatus 200 according to the invention is shown in FIG. 4. The light source 201 is shown in detail in FIG. 5a. FIG. 4 shows a fibre-optic sensor system having a combined continuum/short-pulse beam source and having only one optical waveguide (LWL) for the simultaneous spatially resolved Raman backscattering measurement and FBG measurement, in particular for the detection of mechanical loads of a power cable when the optical waveguide is integrated therein.

Figure 5:
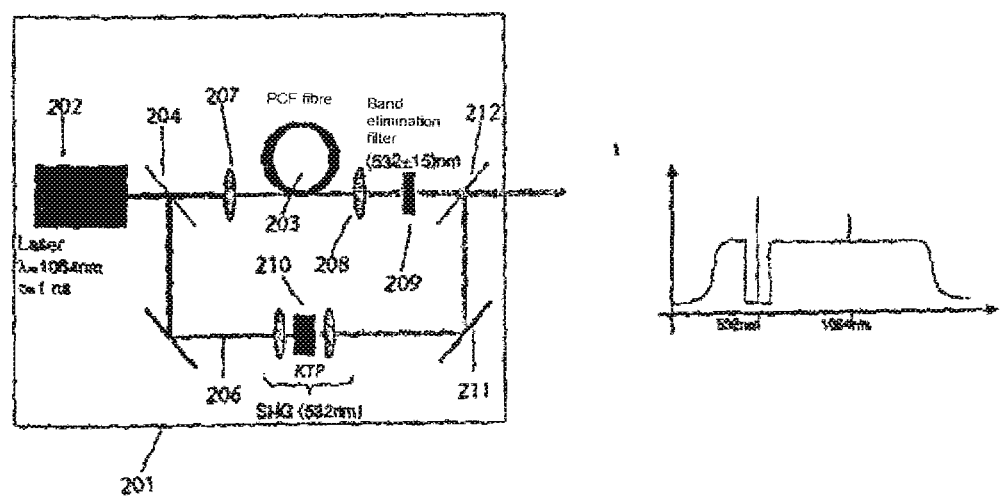
FIG. 5 shows a schematic view of a fibre-optic measuring apparatus.

FIG. 5a shows a combined broad-band and short-pulse source for a fibre-optic measurement system. In this case FIG. 5a shows the structure and the components of the beam source. FIG. 5b shows the spectral intensity distribution of the beam source as a function of the wavelength.

The light source 201 advantageously consists of a microchip laser 202 with tracked or following photonic fibre (PCF fibre) 203 to generate continuum radiation, in particular having spectral broadening. Located after the microchip laser 202 is a beam splitter 204 which splits the beam into the beam 205 and the beam 206. The light source 201 is advantageously a source for a pulsed continuum, a single-frequency laser radiation. Lenses 207, 208 are furthermore located in the beam 205. By means of a so-called notch filter 209 (e.g. 532 nm ±15 nm) the spectral range of the second harmonic of the laser used such as a microchip laser (532 nm) is blocked in the ±15 nm interval for the continuum emission, see the diagram in FIG. 5b in which the intensity of the radiation is plotted as a function of the wavelength.

Figure 6:
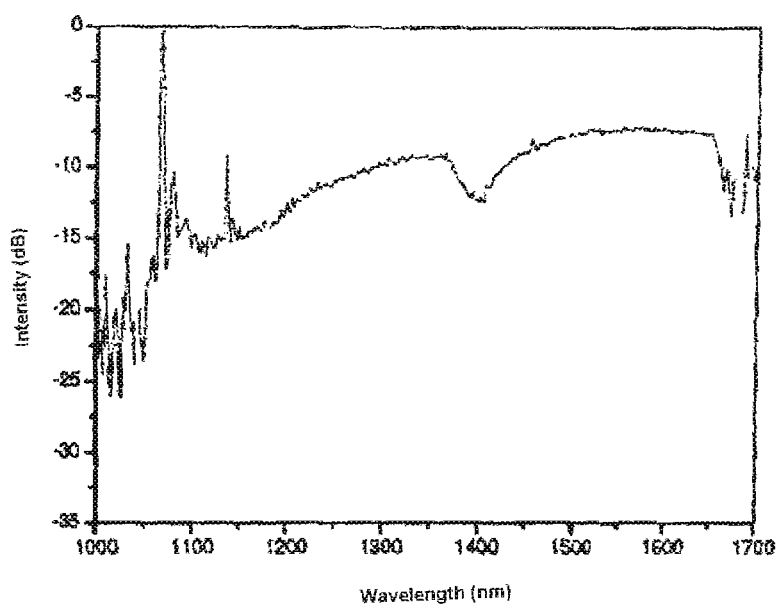
FIG. 6 shows a diagram.

FIG. 6 shows a section of the continuum radiation generated with this arrangement in the infrared spectral range for wavelengths above 1064 nm. FIG. 6 shows in particular the generation of white light in the continuum emission above a wavelength of 1064 nm using a laser such as a microchip laser at 1064 nm wavelength and using a photonic fibre.

A portion of the fundamental of the microchip laser emission (1064 nm) is frequency-doubled to the 532 nm wavelength in a branched steel section 206 using a nonlinear crystal 210 (e.g. KDP crystal) and then superposed again with the output of the PCF fibre. The two apparatuses 211, 212 are provided for this purpose. This results in an emission in the manner as shown in FIG. 5b at the output of the beam source: a broad-band emission having a gap at 532 nm is obtained which is superposed with a high-intensity laser line at 532 nm.

The advantages of this arrangement are that only a single beam source 201 is provided which is suitable both for excitation of FBG sensors 213 in continuum radiation and also for Raman measurements 214 at the 532 nm laser line in a single fibre.

Fibre Bragg grating (FBG) structures 213 having defined wavelengths which then serve as FBG sensors are written into the optical fibre preferably by means of femtosecond laser illumination. As long as the grating wavelength of the FBG 213 does not correspond to the 532 nm wavelength, the 532 nm light pulse is not influenced by the FBGs 213.

In this way a Raman backscattering measurement 214 can be carried out to determine spatially resolved temperatures or squashing in the same fibre 215 which also contains the FBGs 213.

The feedback signals 216, reflected wavelengths of the FBG sensors 213 and the Raman signals 217 are separated from one another by means of a fibre coupler 218 and evaluated independently.

This principle thus enables according to the invention the simultaneous detection of temperatures, squashing and/or mechanical loads such as, for example bending and twisting, of a power cable for example which is preferably provided with a single fibre-optic cable and in which FBGs have been written using the femtosecond laser method.

The method described above is not restricted to the 532 nm wavelength but can also be used for any other light wavelengths if a high-intensity laser pulse wavelength is available in the sought spectral range.

In this measurement principle it is advantageous to use a so-called notch filter such as a notch filter or band-elimination filter for the selected laser wavelength of, for example 532 nm with a suppression of $>10^3$ in a wavelength range of, for example, ±15 nm about the selected laser wavelength in the beam path of the continuum emission. This enables a sensitive measurement of the Stokes and anti-Stokes emission in a temperature determination since then advantageously scarcely any or no superposition with corresponding wavelengths of the continuum emitter occurs.

REFERENCE LIST

1 Measuring apparatus
2 Laser
3 Sensor
4 Sensor
5 Sensor
6 Beam splitter
7 Fibre
8 Fibre
9 Apparatus
10 Fibre Bragg grating
11 Fibre Bragg grating
12 Fibre Bragg grating
13 Glass fibre
14 Microspectrometer
15 Photonic fibre
16 Telecommunications fibre
17 Lens
18 Beam splitter
19 Lens
101 Apparatus
102 Laser
103 Frequency doubling
104 Grey filter
105 Optical waveguide
106 Stokes component
107 Anti-Stokes component/photomultiplier
108 Power cable
109 Beam splitter
110 Trigger diode
111 Aspherical lens
112 Notch filter
113 Grey filter
114 Iris diaphragm
115 Beam splitter
200 Measuring apparatus
201 Light source
202 Microchip laser
203 Photonic fibre
204 Beam splitter
205 Beam
206 Steel section
207 Lens
208 Lens
209 Notch filter
210 Crystal
211 Apparatus
212 Apparatus
213 Fibre Bragg grating
214 Raman backscattering
215 Fibre
216 Signal
217 Raman signal
218 Fibre coupler

The invention claimed is:

1. A fiber optic measuring apparatus comprising a beam source, at least one optical fiber and a number of sensors which are integrated in or provided on the optical fiber cable and detect a mechanical load, a temperature and/or corrosive gases,
characterised in that:
the sensors are supplied with light from the beam source,
the sensors form a fiber optic network, at least two of the sensors are integrated in or provided on the same optical fiber, the optical fiber cable is integrated in a power cable, the beam source is configured for generating continuum radiation and short-pulse emission at a defined laser wavelength, wherein a filter suppresses the continuum radiation in a defined spectral range around the defined laser wavelength, the output of the beam source is a broad-band emission having a gap at the defined spectral range around the defined laser wavelength with a high-intensity laser line at the defined laser wavelength being superimposed in said gap of said broad-band emission, a time-resolved light back-scattering measurement for two differently scattered light components of the short-pulse emission at the defined laser wavelength of the beam source provides the possibility of a local temperature measurement and/or local detection of the mechanical loads of the power cable, the at least one optical fiber comprises periodic refractive index structures, and the mechanical loading of the cable or the fiber is deduced from a shift of the back-reflected frequency components of the continuum radiation from the beam source.

2. The fiber optic measuring apparatus according to claim 1, characterised in that the sensors are coupled to one another in such a manner that the results of the sensors are evaluated by means of a central evaluation unit and the sensor elements are operated with only a single light beam source.

3. The fiber optic measuring apparatus according to claim 2, characterised in that starting from a light source at least one optical fiber is provided, on or in which the sensors are provided.

4. The fiber optic measuring apparatus according to claim 2, characterised in that starting from a light source a beam splitter is provided and at least two optical fibers are provided, on or in which the sensors are provided.

5. The fiber optic measuring apparatus according to claim 4, characterised in that the sensor for detection of a mechanical deformation and the sensor for detection of a temperature are provided on a fiber.

6. The fiber optic measuring apparatus according to claim 5, characterised in that the sensor for detecting a bending is provided on the same or on a different fiber.

7. The fiber optic measuring apparatus according to claim 1, characterised in that the time-resolved measurement of the light back-scattering signals is made after a high-intensity short-pulse laser beam has been coupled into an untreated fiber optic cable.

8. The fiber optic measuring apparatus according to claim 1, characterised in that the two differently scattered light components are the Stokes and the anti-Stokes component.

9. The fiber optic measuring apparatus according to claim 1, characterised in that the light beam source is a passively Q-switched microchip laser with subsequent generation of white light.

10. The fiber optic measuring apparatus according to claim 9, characterised in that the white light is generated by a downstream nonlinear optical component.

11. The fiber optic measuring apparatus according to claim 10, characterised in that frequency ranges are filtered out from the white light spectrum by means of optical filters, by which means the individual sensor elements are triggered.

12. The fiber optic measuring apparatus according to claim 10, wherein the nonlinear optical component is a photonic fiber.

13. The fiber optic measuring apparatus according to claim 1, characterised in that the networking of the individual sensors or sensor elements is accomplished by multiplexing and the interrogation of the measurement signals is accomplished sequentially.

14. The fiber optic measuring apparatus according to claim 1, characterised in that the filter is a so-called notch filter or band-elimination filter or notch filter.

15. A measuring apparatus according to claim 1, in which electromagnetic radiation generated by a beam source can be coupled into a fiber optic cable, in particular for the simultaneous measurement of spatially resolved temperatures and mechanical loads, wherein the fiber optic cable is provided with FBGs.

16. The measuring apparatus, in particular according to claim 15, characterised in that the period of the FBGs is selected so that no FBG corresponds to the selected laser wavelength so that the radiation having the selected laser wavelength can propagate undisturbed in the optical waveguide and can advantageously be used for spatially resolved measurement of temperature or squashing.

17. The measuring apparatus, in particular according to claim 16, characterised in that the FBGs are written into the fiber optic cable with ultrashort light pulses.

18. The measuring apparatus according to claim 17, characterised in that the reflected signal components of the sensors are separated from one another by means of a fiber coupler.

19. The measuring apparatus, according to claim 17, wherein the ultrashort light pulses are femtosecond light pulses.

20. The fiber optic measuring apparatus according to claim 1, wherein the mechanical loading of the cable or the fiber is due to bending or twisting.

* * * * *